United States Patent
Battaglia

[19]

[11] Patent Number: 5,950,664
[45] Date of Patent: Sep. 14, 1999

[54] VALVE WITH IMPROVED COMBINATION BEARING SUPPORT AND SEAL

[76] Inventor: Larry A. Battaglia, 204 Peytonia La., Suisun City, Calif. 94585

[21] Appl. No.: 08/802,788
[22] Filed: Feb. 18, 1997
[51] Int. Cl.⁶ .................................................. F16K 25/00
[52] U.S. Cl. ................ 137/375; 137/454.6; 137/625.32; 251/310; 251/368
[58] Field of Search ................. 137/625.32, 454.6; 251/368, 310

[56] References Cited

U.S. PATENT DOCUMENTS

| | | | |
|---|---|---|---|
| 1,819,343 | 8/1931 | Shipley | 137/625.32 |
| 3,592,440 | 7/1971 | McFarland et al. | 251/368 |
| 3,780,758 | 12/1973 | DeVries | 137/454.6 |
| 4,118,009 | 10/1978 | Chmura | 251/368 |
| 4,377,892 | 3/1983 | Gonzalez | 251/368 |

Primary Examiner—A. Michael Chambers
Attorney, Agent, or Firm—Henderson & Sturm

[57] ABSTRACT

A valve body having a first and a second port and, optionally, a removable cartridge disposed in the valve body between the first and second ports. A bearing insert is attached to and disposed in the optional cartridge and a rotor having a passageway through is disposed in sealing contact with the bearing insert and is movable between an open position and a closed position.

17 Claims, 7 Drawing Sheets

VALVE WITH IMPROVED COMBINATION BEARING SUPPORT AND SEAL

CROSS-REFERENCE TO RELATED APPLICATIONS

Not Applicable.

STATEMENT REGARDING FEDERALLY SPONSORED RESEARCH OR DEVELOPMENT

Not applicable.

MICROFICHE APPENDIX

Not Applicable.

BACKGROUND OF THE INVENTION

The present invention relates generally to valves and more particularly to a valve with an improved bearing support and seal combination. Valves of the aforementioned type are often used as a fuel valve and controller for gas turbines. If this valve should fail for any reason, it is an extremely expensive process to stop the gas turbine and replace the fuel valve. Accordingly, it is very important to have a valve in such application which will operate effectively, require low operating torque, provide an effective main valve seal, and have a long life.

One of the problems with the prior art is that after only a short period of use, the valve rotor has been known to lock up, rendering the valve inoperable. If the clearance between the rotor and cartridge is increased to prevent lock-up, flow will continue through the valve even when the valve is in the closed position.

Therefore, one of the necessary features of such a valve is to have a high turn-down ratio, meaning essentially the ability to control the flow and stop the valve from leaking as the rotor approaches the closed position. This requires the valve parts to be made with very close tolerances. These close tolerance requirements increase the expense of manufacture and also cause the valve to wear out sooner than is desired because of galling between the mating surfaces and/or being more susceptible to dirt particles which wear out the sealing surfaces and the bearing surfaces. Additionally, if these sealing and bearing surface areas are small mating parts they will wear out sooner than if a larger sealing or bearing surface is used.

BRIEF SUMMARY OF THE INVENTION

The present invention relates generally to a valve body having a first and a second port and a removable cartridge disposed in the valve body between the first and second ports. A bearing insert is attached to and disposed in the cartridge and a valve member having a passageway therethrough is disposed in sealing contact with the bearing insert and is movable between an open position and a closed position. In preferred embodiments, the bearing insert is constructed of a composite material comprising a steel outer layer, a bronze inner layer and a polytetrafluoroethylene (PTFE) overlay attached to the inside of the bronze inner layer. However, the bearing insert may also be constructed of a number of other materials or composites including; ultra-high-molecular-weight (UHMW) polyethylene (PE), bronze, carbon, polytetrafluoroethylene (PTFE), perfluoralkoxy (PFA), fluoronated ethylene propylene copolymer (FEP), ethylene-tetrafluro-ethylene (ETFE), polyvinylidene fluoride (PVDF), ethylene-chlorotrifluoroethylene copolymer (ECTFE), polyphenylene sulfide (PPS), PEEK (polyetheretherketone), polyamide, polyimide, polyamide-imide, glass, ABS, acetal, PVC, CPVC, epoxy, silicone, polycarbonate, polyester, polypropylene as well as others. When determining the material for constructing the bearing insert, consideration should be given to the type of service the valve will be used for, temperature requirements, chemical resistance, resistance to thermal shock, and manufacturing economies. These materials may have their properties enhanced by the addition of other materials such as graphite, glass and molybdenum.

An object of the present invention is to provide a valve with a high turn-down ratio, i.e., the ability to have a very low leakage as the rotor approaches and reaches the closed position and good control when the valve is metering flow.

Another object of the present invention is to provide a valve with a bearing interface between a rotor and a cartridge which allows the manufactured part tolerances to be larger than those tolerances required for valves with similar performances and, further, allows tolerances to be kept small without the adverse effects of sliding metal against metal.

A still further object of the invention is to provide a valve which is dirt tolerant.

Other objects, advantages, and novel features of the present invention will become apparent from the following detailed description of the invention when considered in conjunction with the accompanying drawings.

DETAILED DESCRIPTION OF THE INVENTION

Figure 1:
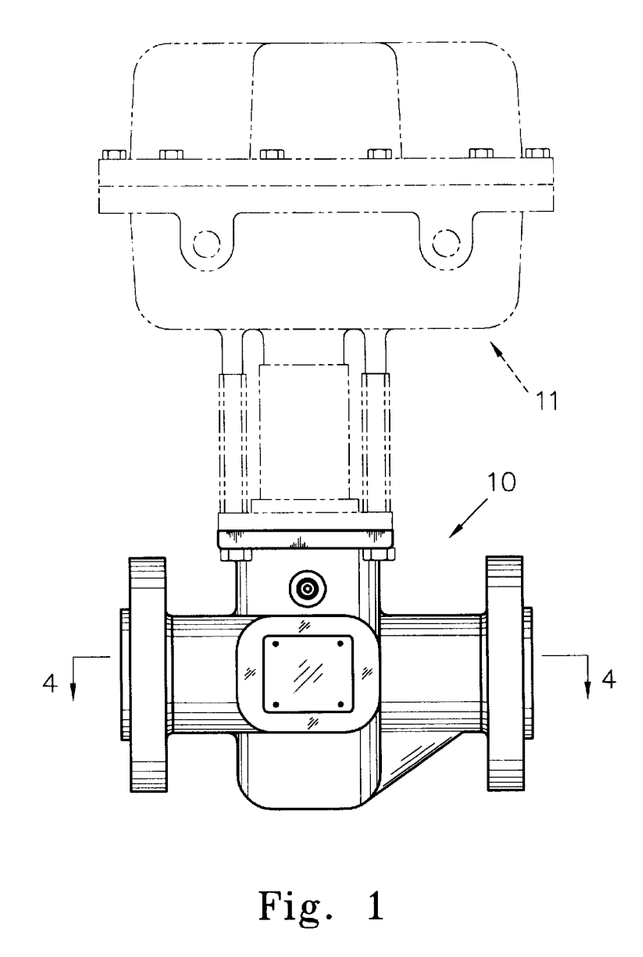
FIG. 1 is a front elevation view of the valve of the present invention showing the valve body in solid lines and the valve operator in broken lines.
Figure 2:
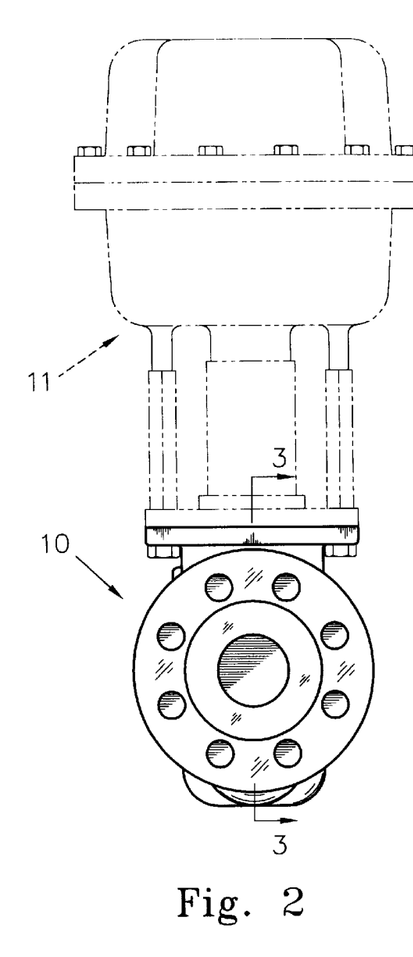
FIG. 2 is a side elevational view of the structure of FIG. 1.

Referring now to the drawings wherein like reference numerals designate identical or corresponding parts throughout the several views, FIG. 1 shows a valve (10) connected to a valve operator (11) which is used to meter flow through the valve (10) or to move the valve between the fully-open and the fully-closed positions thereof.

Referring to FIGS. 3A, 3B, 4A and 4B, a valve body (12) has an inlet port (13) and an outlet port (14). A cylindrical opening (15) in the valve body receives a removable cartridge (16) having a plurality of O-ring seals (17) disposed in grooves in the removable cartridge (16). A bearing insert (18) is disposed in an interference fit with the interior of a cylindrical opening (19) in the removable cartridge (16) and because it is important that the bearing insert (18) remain in position, an adhesive (not shown) may be applied to the exterior of the bearing insert (18) or the interior of cylindrical cavity (19) before the bearing insert (18) is put in place.

Figure 5:
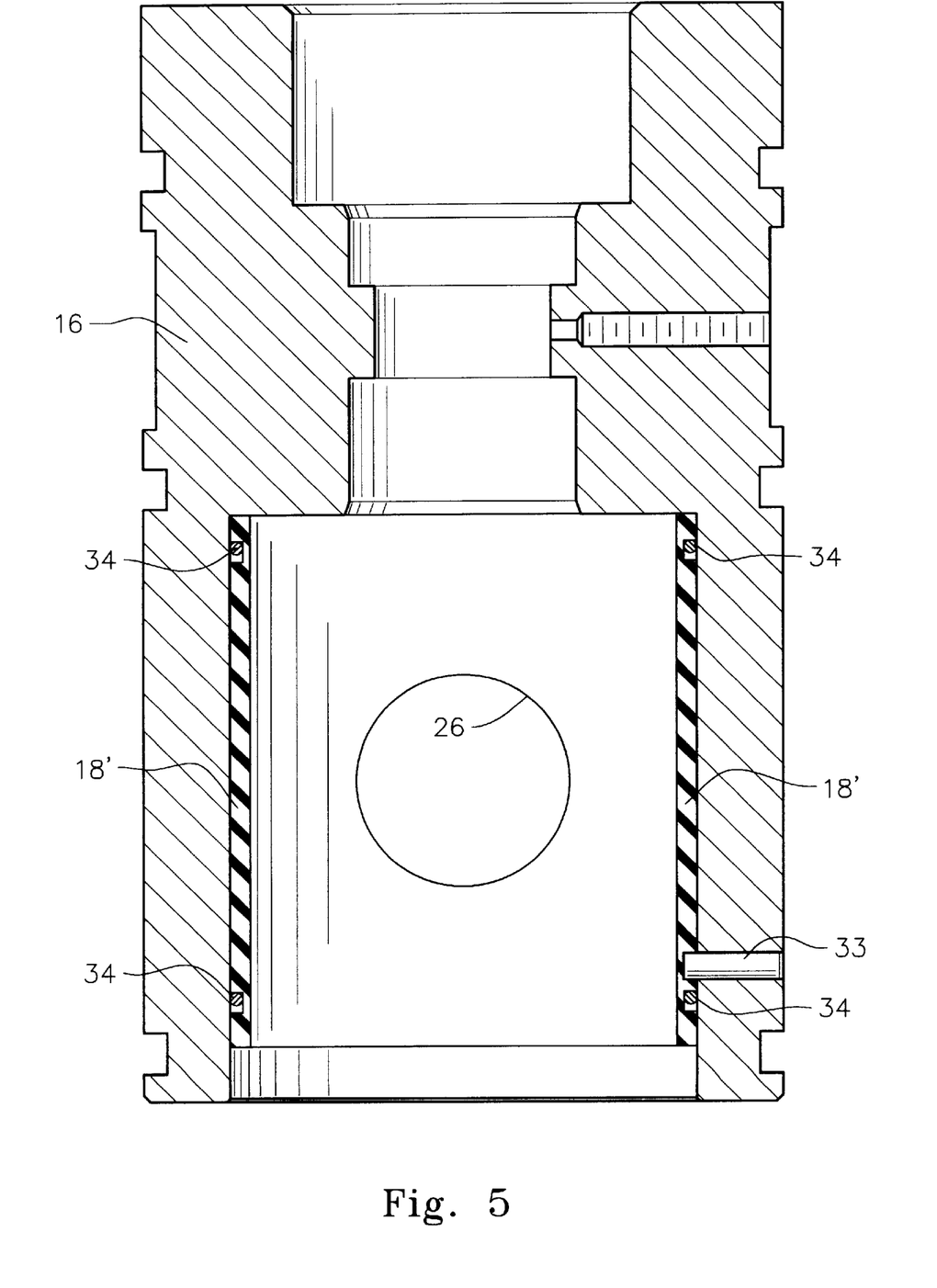
FIG. 5 is a section view illustrating an alternate embodiment of the cartridge and bearing insert showing a removable bearing insert.

An alternate embodiment to that just described is represented in FIG. 5. Rather than having a fixed bearing insert (18), a removable bearing insert (18') may be used. The removable bearing insert (18') is sealed in the cylindrical cavity (19) of the removable cartridge (16) by elastomeric seals such as O-rings (34) disposed in grooves around the exterior periphery of the removable bearing insert (18'). The bearing insert (18') is also retained in position by a pin (33) extending through the wall of the cartridge (16) and into the wall of the bearing insert (18'). Because the removable bearing insert (18') is not adhered to the interior cavity (19) of the cartridge (16), a slight amount of vertical and angular motion as well as some lateral motion takes place between the removable bearing insert (18') and cartridge (16). A distinct advantage of having a removable bearing is that the removable bearing (18') may be replaced without having to replace the entire cartridge (16) as required when utilizing the fixed bearing insert (18).

Figure 3A:
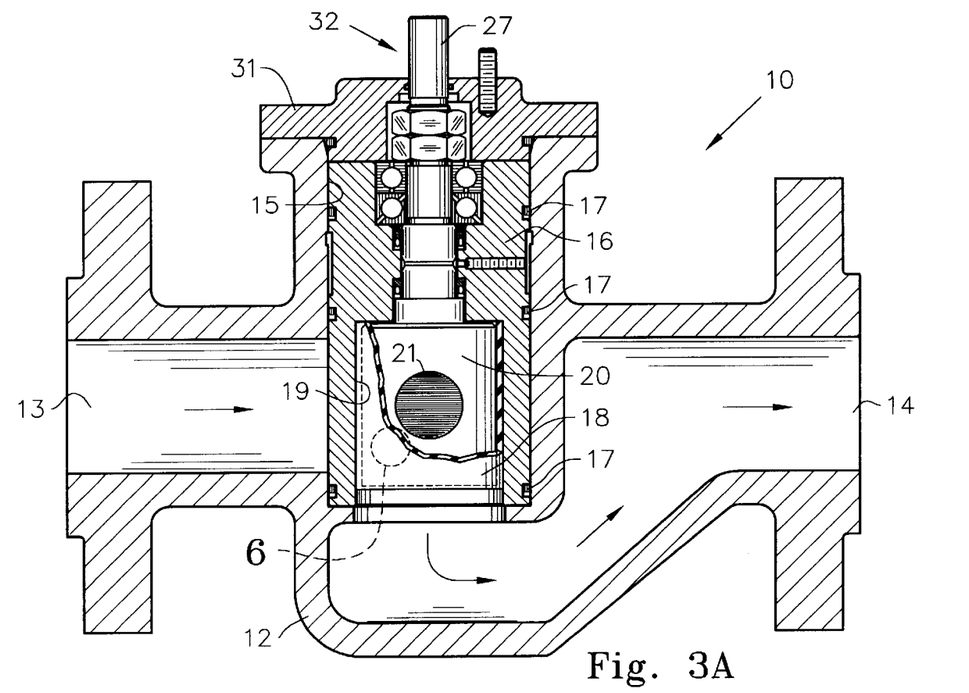
FIG. 3A is a cross sectional view taken along lines 3—3 of FIG. 2 with the valve in a fully opened position and having a portion of the bearing insert broken away.
Figure 3B:
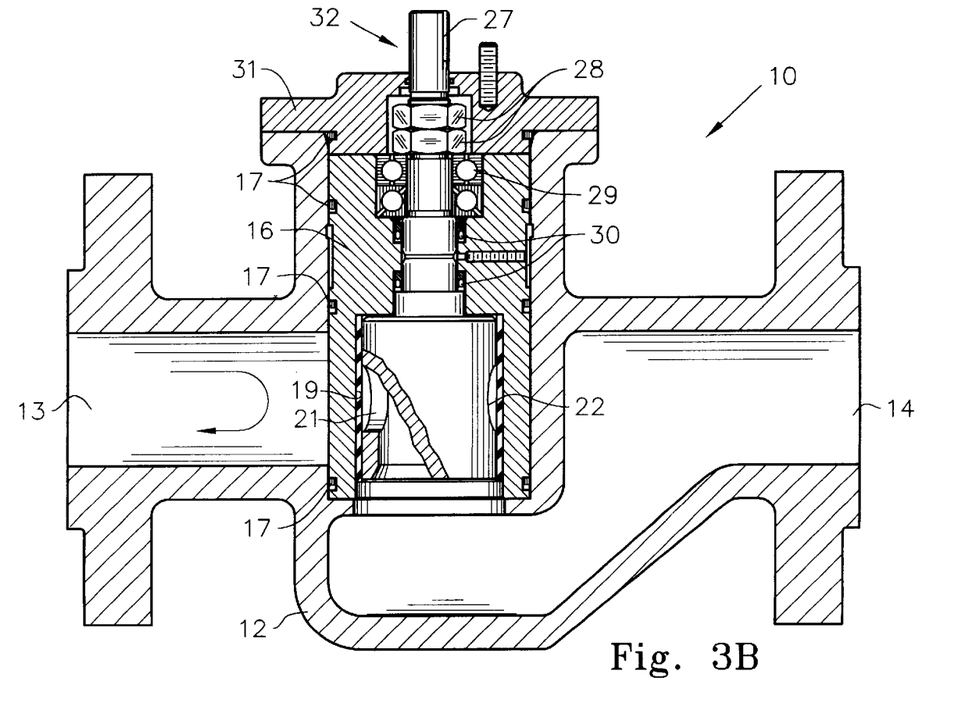
FIG. 3B is also a cross sectional view taken along line 3—3 of FIG. 2, with the valve in a fully closed position and showing the bearing insert in cross section and a portion of the rotor being broken away to show the interior thereof.
Figure 4A:
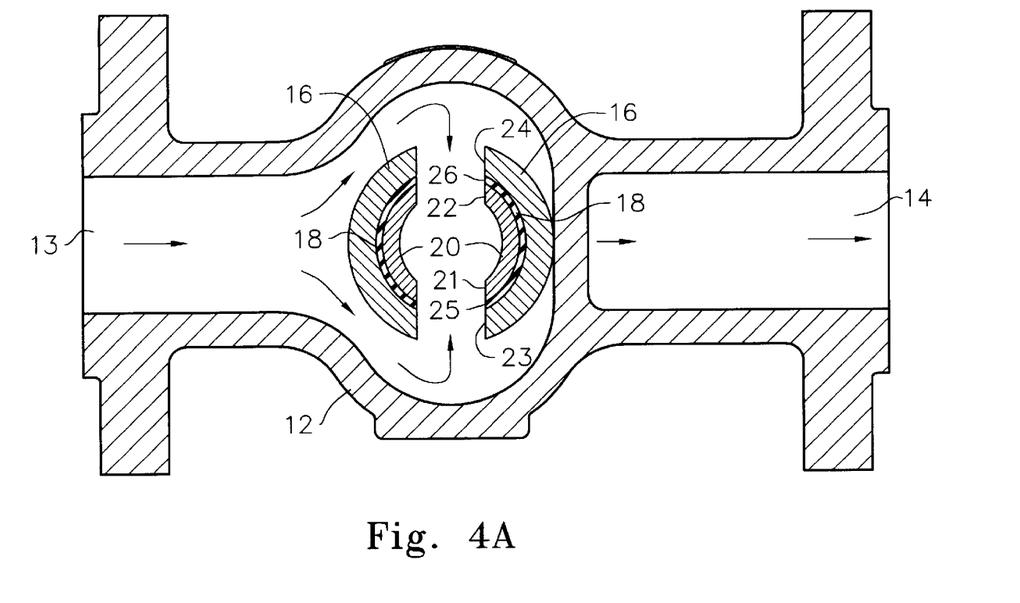
FIG. 4A is a cross sectional view taken along lines 4—4 of FIG. 1 showing the valve in a fully opened position.
Figure 4B:
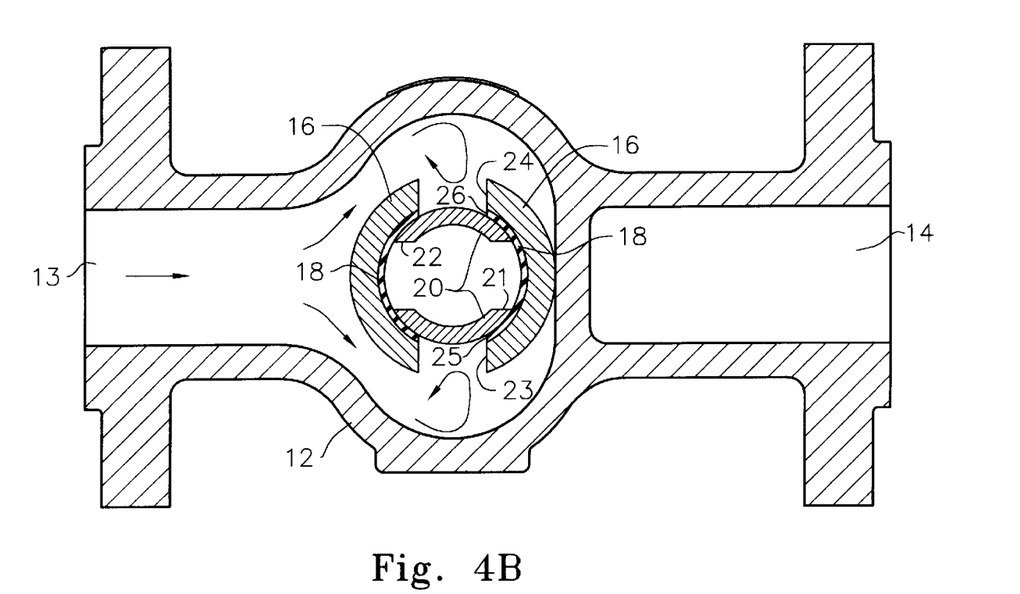
FIG. 4B is also a cross sectional view taken along lines 4—4 of FIG. 1 showing the valve in a fully closed position.

A valve member or rotor (20) is disposed in sealing relationship, with a slight clearance fit, within the bearing insert (18 or 18') so that the bearing insert (18 or 18') serves to function not only as a bearing, but also as a seal. The rotor (20) has an open interior section as can be seen in FIGS. 3B, 4A and 4B and has openings (21 and 22) therein. When the rotor (20) is in the fully open position (as shown in FIGS. 3A and 4A), the openings (21 and 22) are aligned with similar openings (23 and 24) in the cartridge (16) and with openings (25 and 26) in the bearing insert (18 or 18').

A post (27) is rigidly attached to the rotor (20) and is held in position by nuts (28). Bearings (29) seal the valve stem (32). Cap (31) is bolted to the valve body (12) to hold everything in place.

Figure 6:
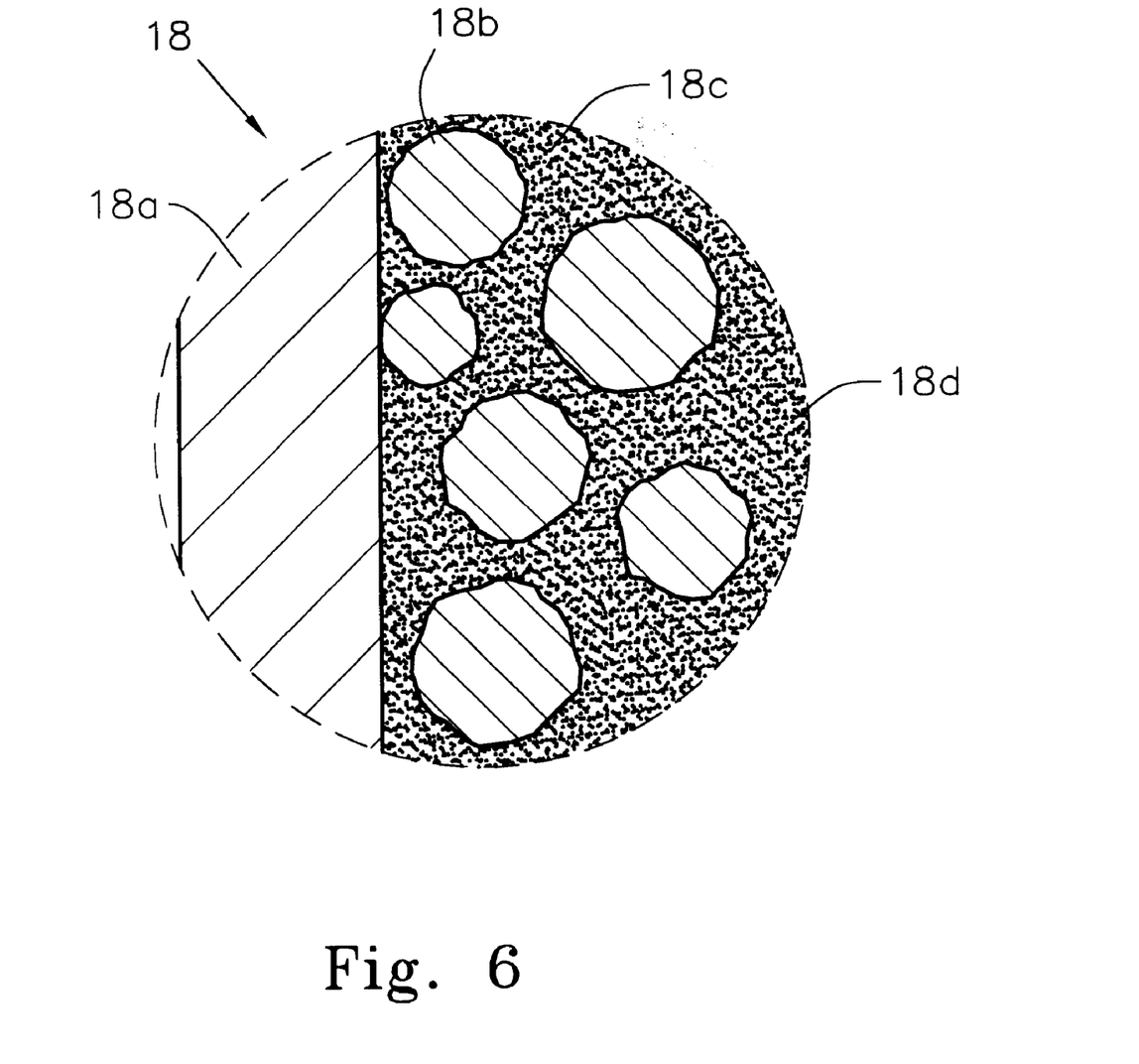
FIG. 6 is an enlarged view of the circled portion 6 of FIG. 3A showing what the composite material of the bearing insert would look like under a microscope.

FIG. 6 represents the bearing insert (18) constructed of a composite material comprising a steel outer layer (18a), a bronze inner layer (18b) and a polytetrafluoroethylene (PTFE) overlay (18d) attached to the inside of the bronze inner layer (18b). The steel backing (18a) is shown in cross section and the porous bronze inner structure (18b) is shown having a reservoir of PTFE and lead (18c). The extreme inner portion (18d) is the PTFE-lead overlay.

The bearing insert (18 or 18') can also be constructed of an ultra-high molecular weight (UHMW) polyethylene. This is desirable because it has a natural lubricity similar to candle wax, yet it is extremely abrasion resistant. The use of these materials for constructing the bearing insert make up for machining difficulties and eliminates the need for close tolerances. When the rotor (20) is inserted in the bearing insert in a slight clearance fit, the bearing insert (18 or 18') will deform to cause a good, tight sealing surface and also a bearing surface. As shown in FIG. 6, fluid flowing through the valve can pressurize the space between the bearing (18') and the cartridge (16) and increase the force of the bearing (18') against the rotor (20) and improve the valve sealing.

In addition to the two types of materials mentioned above, the bearing insert (18 or 18') may also be constructed out of a number of other materials including; bronze, carbon, PTFE, PFA, FEP, ETFE, PVDF, ECTFE, PPS, PEEK, polyamide, polyimide, polyamide-imide, glass, ABS, acetal, PVC, CPVC, epoxy, silicone, polycargonate, polyester polypropylene as well as others. When determining the material for constructing the bearing insert (18 or 18'), consideration should be given to the type of service the valve will be used for, temperature requirements, chemical resistance, resistance to thermal shock, and manufacturing economies.

Tests performed on a valve with a bearing interface made of the composite material shown in FIG. 6 indicate that one million cycles are possible. The reason for the long life is that the use of the bearing interface (18 or 18') between the rotor (20) and the cartridge (16) allows manufacturing tolerances to be greater than the tolerances required to make the valve function effectively without a bearing interface. This feature also enables the valve to be offered at a competitive price. The relatively soft bearing surface of the composite shown in FIG. 6 or the ultra-high molecular weight (UHMW) polyethylene will conform as necessary to accommodate some initial interference between the mating parts. Because the material used for the bearing insert has a low friction coefficient and because the bearing loads are small, the rotor (20) does not lock up. During cycling, the bearing insert (18 or 18') deforms until there is little or zero clearance between the parts, therefore the bearing insert (18 or 18') will show little wear from use after the initial break-in period. The bearing insert (18 or 18'), also supports the lower part of the rotor (20) and reduces the forces which might also cause a valve lock-up.

Additionally, the bearing insert characteristics enhance sealing. One of the design features of this valve is the "high turn-down ratio" or the ability to have a very low leakage when the rotor (20) approaches and/or reaches the closed position. It has been discovered during the testing period that the bearing insert surface material will deform and flow into the clearance space between the rotor (20) and bearing insert (18 or 18'). This helps to plug the space therebetween and prevent leakage. Further, the surface of the bearing insert (18 or 18') is relatively rough. The roughness assists in preventing leakage by providing a labyrinth effect. Also, the fitting of the bearing insert (18 or 18') into the cylindrical cavity (19) of cartridge (16) causes some deformation and enhances the effect of the surface irregularity of the bearing insert (18 or 18'). Additionally, the bearing insert (18 or 18') is very dirt-tolerant. In use, small particles of dirt will embed themselves into the bearing insert surface. Because this design has such a large bearing surface (essentially the complete rotor face) there is a large amount of area for dirt particles to embed into before the bearing insert (18 or 18') wears out.

Figure 3C:
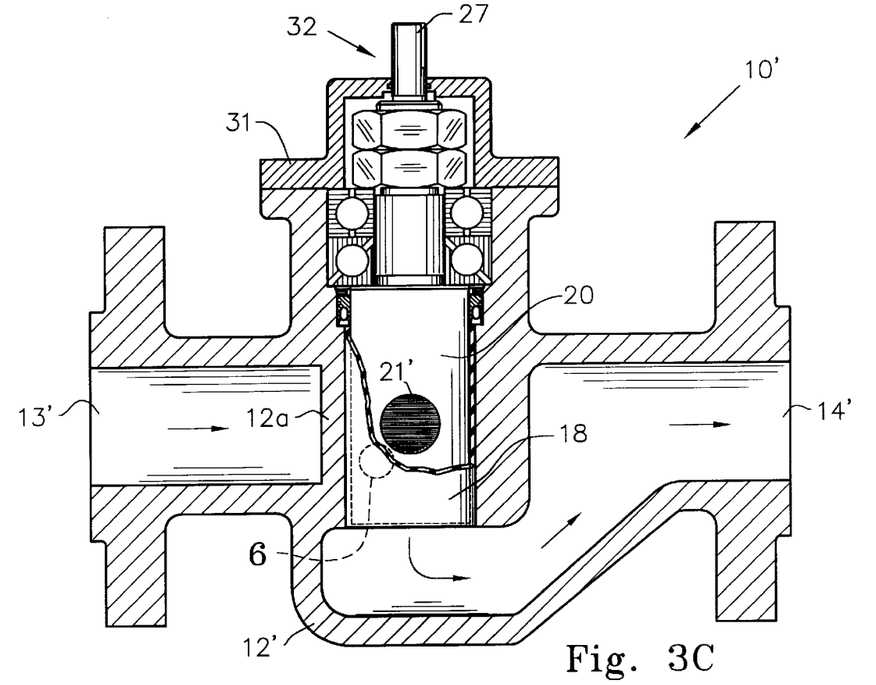
FIG. 3C is a cross sectional view of an alternate embodiment with the valve in a fully opened position and having a portion of the bearing insert broken away.
Figure 3D:
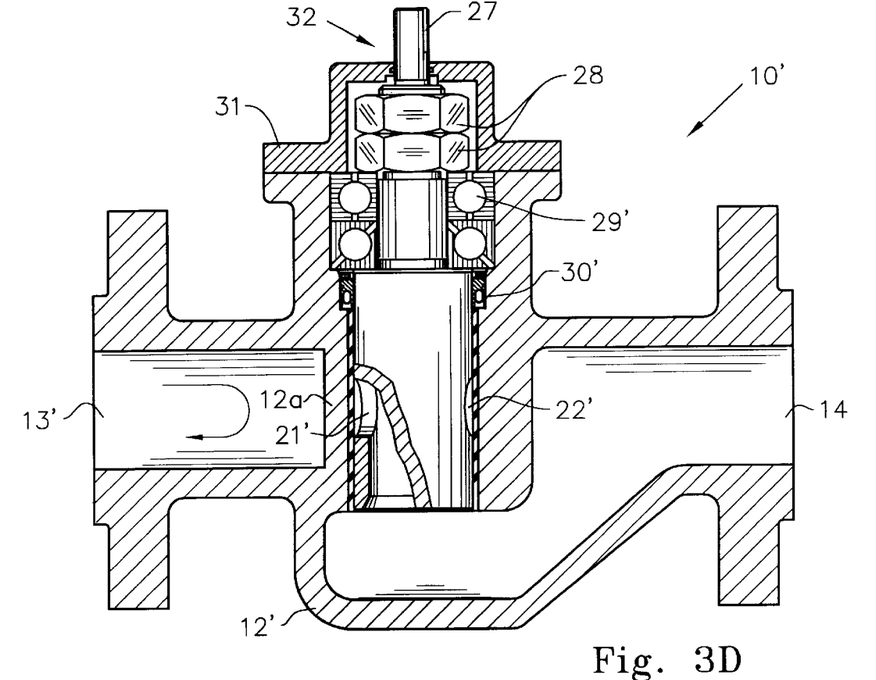
FIG. 3D is also a cross sectional view of the embodiment of FIG. 3C, with the valve in a fully closed position and showing the bearing insert in cross section and a portion of the rotor being broken away to show the interior thereof.
Figure 4C:
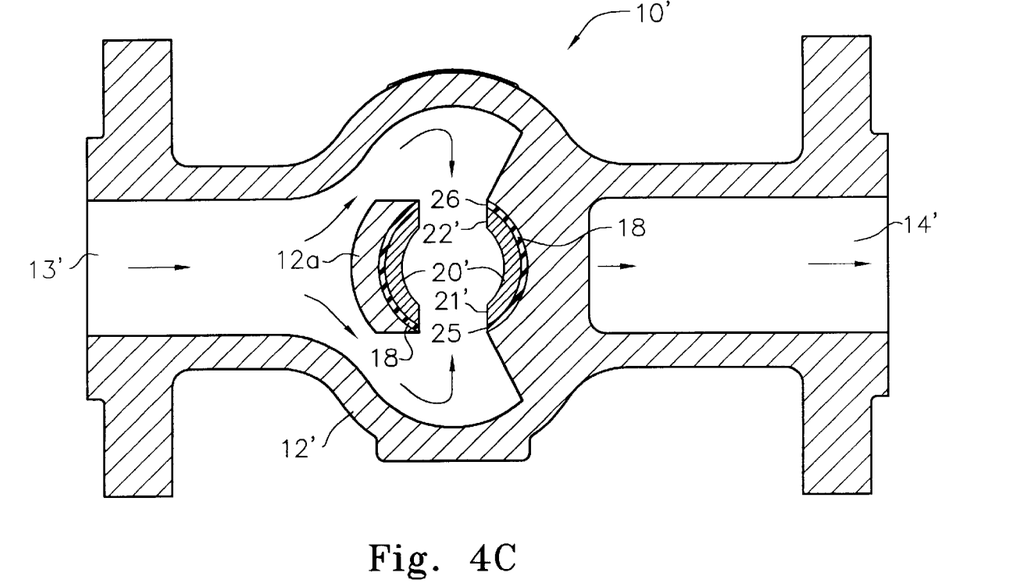
FIG. 4C is a cross sectional view of the embodiment of FIG. 3C showing the valve in a fully opened position.
Figure 4D:
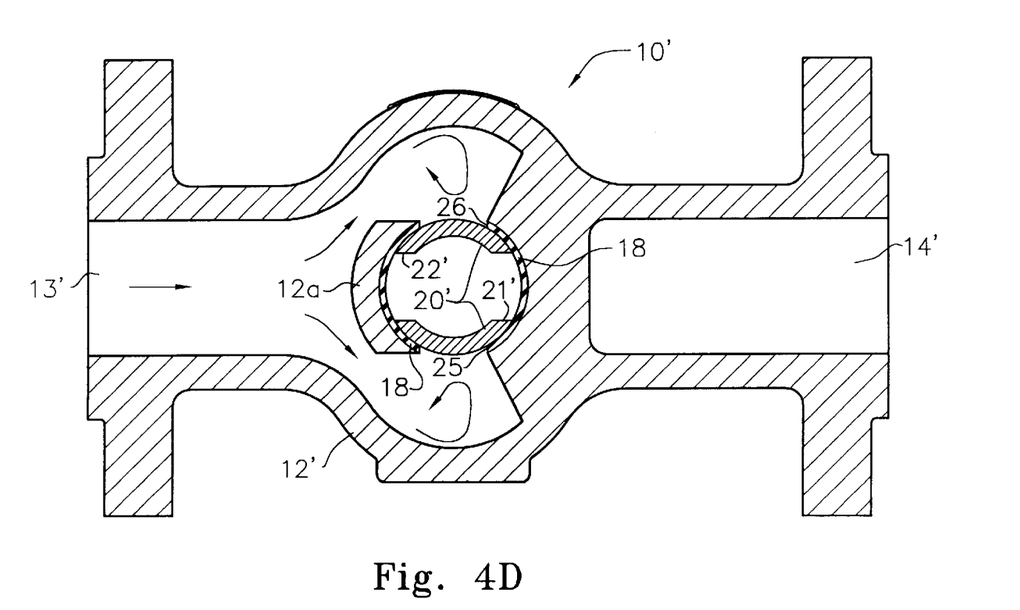
FIG. 4D is also a cross sectional view of the embodiment of FIG. 3C showing the valve in a fully closed position.

Referring now to the alternate embodiment shown in FIGS. 3C, 3D, 4C and 4D, a valve member or rotor (20') is disposed in sealing relationship, with a slight clearance fit, within the bearing insert (18) so that the bearing insert (18) serves to function not only as a bearing, but also as a seal. The rotor (20') has an open interior section as can be seen and has openings (21' and 22') therein. When the rotor (20') is in the fully open position (as shown in FIGS. 3C and 4C), the openings (21' and 22') are aligned with similar openings (23' and 24') in the housing (12') and with openings (25' and 26') in the bearing insert (18).

A post (27) is rigidly attached to the rotor (20') and is held in position by nuts (28). Bearings (29') seal the valve stem (32). Cap (31) is bolted to the valve body (12) to hold everything in place. Essentially, the valve (10') of FIGS. 3C, 3D, 4C and 4D is the same as valve (10) of FIGS. 1–5, except that the cartridge (16) has been eliminated.

Accordingly, it will be appreciated that the preferred embodiments shown herein will indeed accomplish the aforementioned objects. Obviously, many modifications and variations of the present invention are possible in light of the above teachings. It is therefore to be understood that, within the scope of the appended claims, the invention may be practiced otherwise than as specifically described.

What is claimed is:

1. A valve comprising:
   a valve body having a first port and a second port;
   a removable cartridge disposed in said valve body between the first and the second ports;
   a bearing insert attached to and disposed in the cartridge; and
   a rotor having a passageway therein, said rotor being disposed in sealing contact with the bearing insert and movable between an open position wherein the passageway is in fluid communication with the first and second ports and a closed position.

2. The valve of claim 1 wherein said bearing insert comprises:
   a steel outer layer attached to said removable cartridge;
   a porous bronze inner layer attached to said steel outer layer; and
   a polytetrafluoroethylene overlay attached to the inside of the porous bronze inner layer.

3. The valve of claim 1 wherein said bearing insert comprises:
   a layer of ultra-high molecular weight polyethylene in contact with the rotor.

4. The valve of claim 1 wherein said bearing insert is constructed from material selected from the group comprising:
   bronze, carbon, PTFE, PFA, FEP, ETFE, PVDF, ECTFE, PPS, PEEK, polyamide, polyimide, polyamide-imide, glass, ABS, acetal, PVC, CPVC, epoxy, silicone, polycarbonate, polyester, polypropylene, and polyurethane.

5. The valve of claim 2, 3 or 4 wherein the cartridge has an interior periphery and the bearing insert has an exterior and an interior periphery, said exterior periphery of the bearing insert being smaller than the interior periphery of the cartridge whereby the bearing insert is disposed in a clearance fit into the cartridge.

6. The valve of claim 2, 3 or 4 wherein the cartridge has an interior periphery and the bearing insert has an exterior and an interior periphery, said exterior periphery of the bearing insert being larger than the interior periphery of the cartridge whereby the bearing insert is disposed in a press fit into the cartridge.

7. The valve of claims 2, 3 or 4 including means for permitting the rotor to rotate between said open and closed positions thereof.

8. The valve of claim 6 wherein an adhesive is disposed between the interior periphery of the cartridge and the exterior periphery of the bearing insert for preventing movement with respect thereto.

9. The valve of claim 6 or 5 wherein the rotor has an exterior periphery, said exterior periphery being larger than the interior periphery of the bearing insert for causing the rotor to seal against the bearing insert.

10. The valve of claim 5 wherein the bearing insert is seated in the interior periphery of the cartridge by elastomeric seals and held in position by a pin extending through the wall of the cartridge and into the wall of the bearing insert.

11. The valve of claim 1 including:
    means for sealing the cartridge to the valve body.

12. The valve of claim 1 wherein said removable cartridge has a third port and a fourth port and said bearing insert has a fifth port and a sixth port aligned with said third and fourth ports respectively.

13. The valve of claim 1 wherein said removable cartridge is disposed completely around said bearing insert, from one end of the bearing insert to the other end thereof.

14. A valve comprising:
    a valve body having a first port and a second port;
    a removable cartridge disposed in said valve body between the first and the second ports;
    a bearing insert attached to and disposed in the cartridge; and
    a valve member having a passageway therein, said valve member being disposed in sealing contact with the bearing insert and movable between an open position wherein the passageway is in fluid communication with the first and second ports and a closed position.

15. The valve of claim 14 wherein said removable cartridge has a third port and a fourth port and said bearing insert has a fifth port and a sixth port aligned with said third and fourth ports respectively.

16. The valve of claim 14 wherein said removable cartridge is disposed completely around said bearing insert, from one end of the bearing insert to the other end thereof.

17. A valve comprising:
    a valve body having a first port and a second port;
    a valve member disposed in said valve body between said first and second ports and having a passageway therein, said valve member being disposed in sealing contact with the valve body and movable between an open position wherein the passageway is in fluid communication with the first and second ports and a closed position blocking at least one of the first and second ports;
    a bearing insert surrounding said valve member and being in abutment with and attached to said valve body and wherein said bearing insert is constructed from material selected from the following group:
    bronze, carbon, PTFE, PFA, FEP, ETFE, PVDF, ECTFE, PPS, UHMW PE, peek, polyamide, polyimide, polyamide-imide, glass, ABS, acetal, PVC, CPVC, epoxy, silicone, polycarbonate, polyester, polypropylene and polyurethane; and
    a bronze inner layer with a PTFE overlay attached to the inside of the bronze inner layer.

* * * * *

UNITED STATES PATENT AND TRADEMARK OFFICE
CERTIFICATE OF CORRECTION

PATENT NO : 5,950,664
DATED : September 14, 1999
INVENTOR(S) : Larry A. Battaglia It is certified that error appears in the above-identified patent and that said Letters Patent is hereby corrected as shown below:

On title page, insert the following:
-- AMOT Controls Corporation, Richmond, California--

Signed and Sealed this

Eighth Day of August, 2000

Attest:

Q. TODD DICKINSON

Attesting Officer

Director of Patents and Trademarks